J. COOK.
WELDING MACHINE.
APPLICATION FILED JUNE 21, 1911.
1,130,258.
Patented Mar. 2, 1915.
3 SHEETS—SHEET 1.
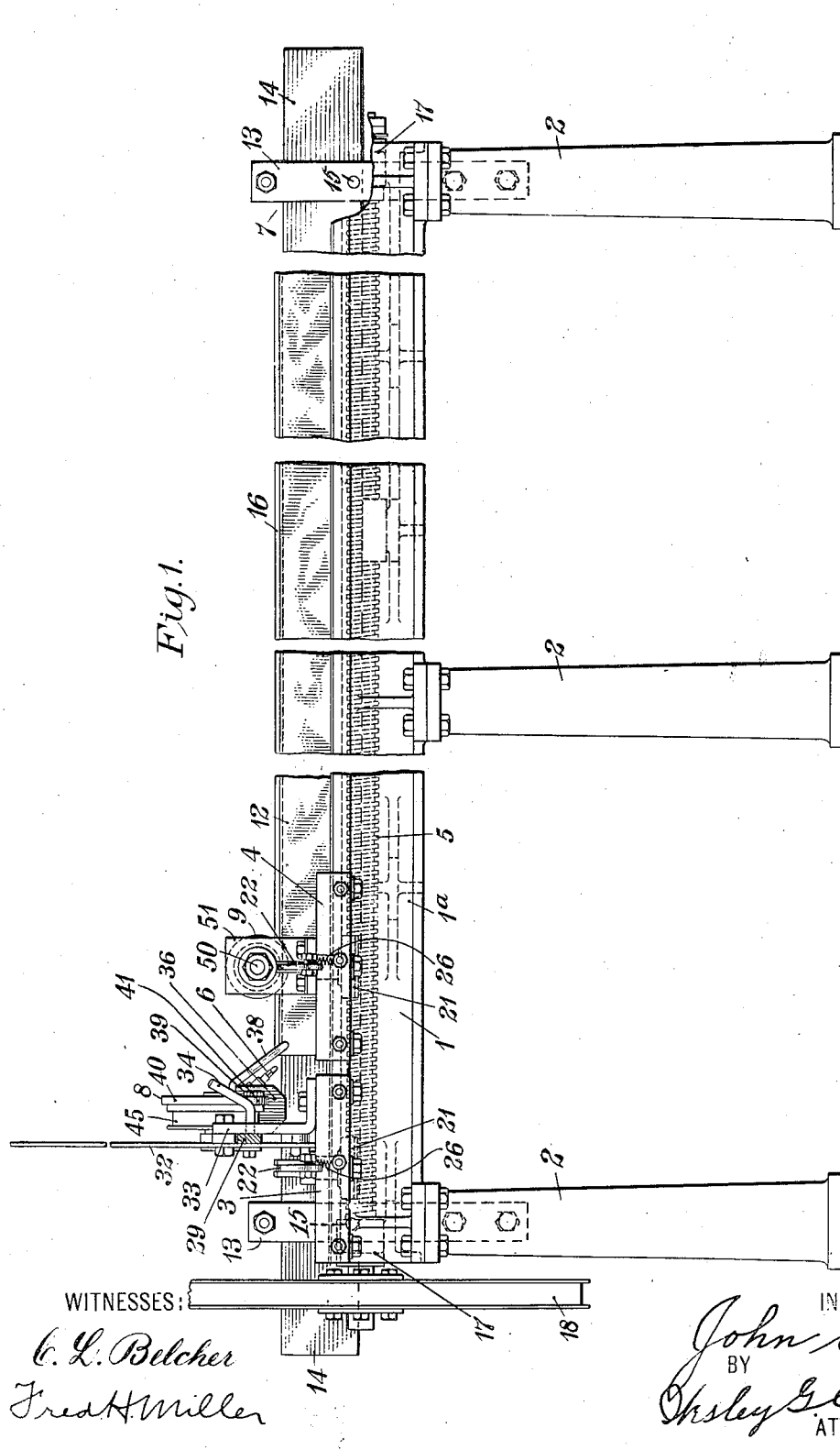
WITNESSES:
C. L. Belcher
Fred H. Miller
INVENTOR
John Cook
BY
Ihsley G. Carr
ATTORNEY

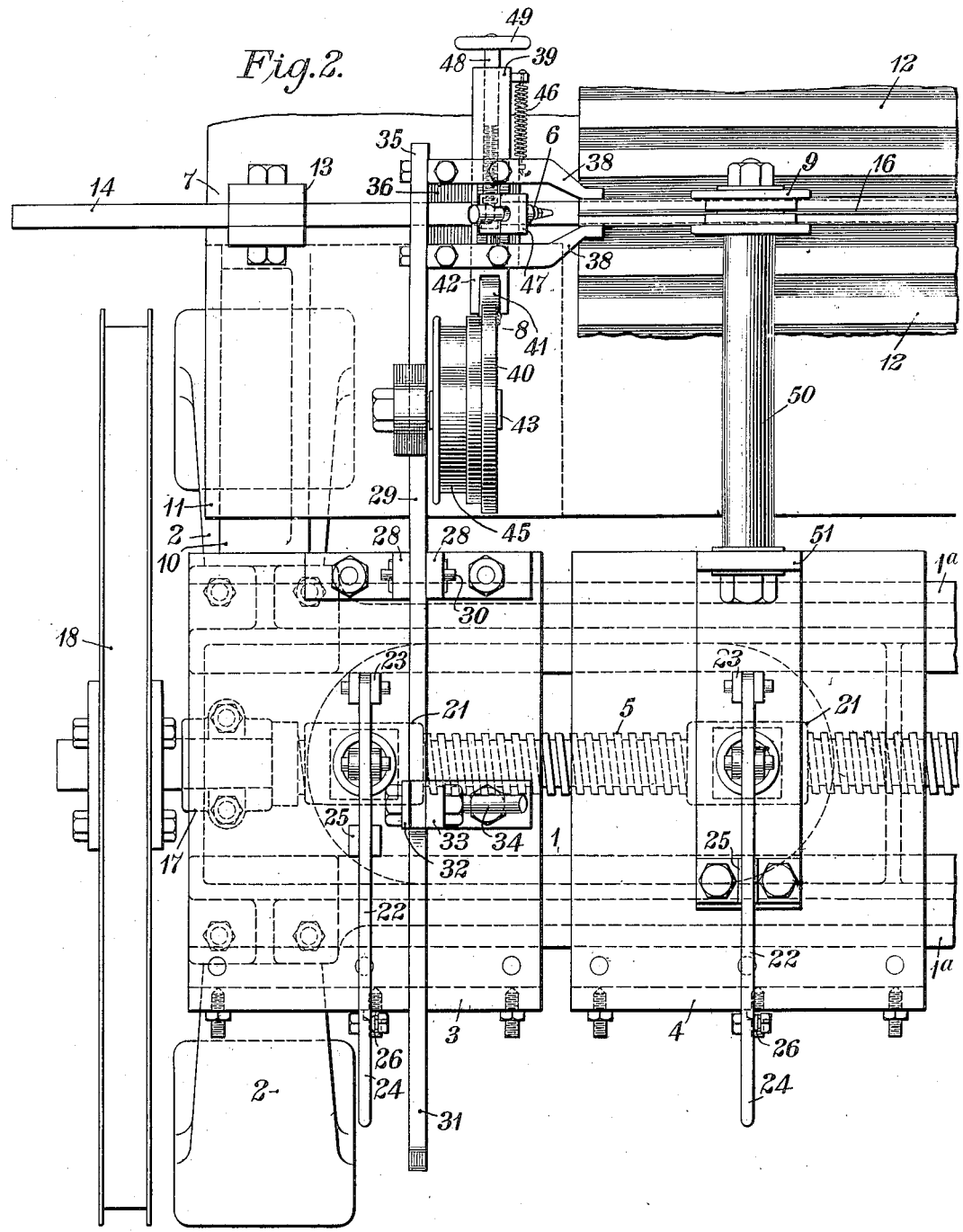

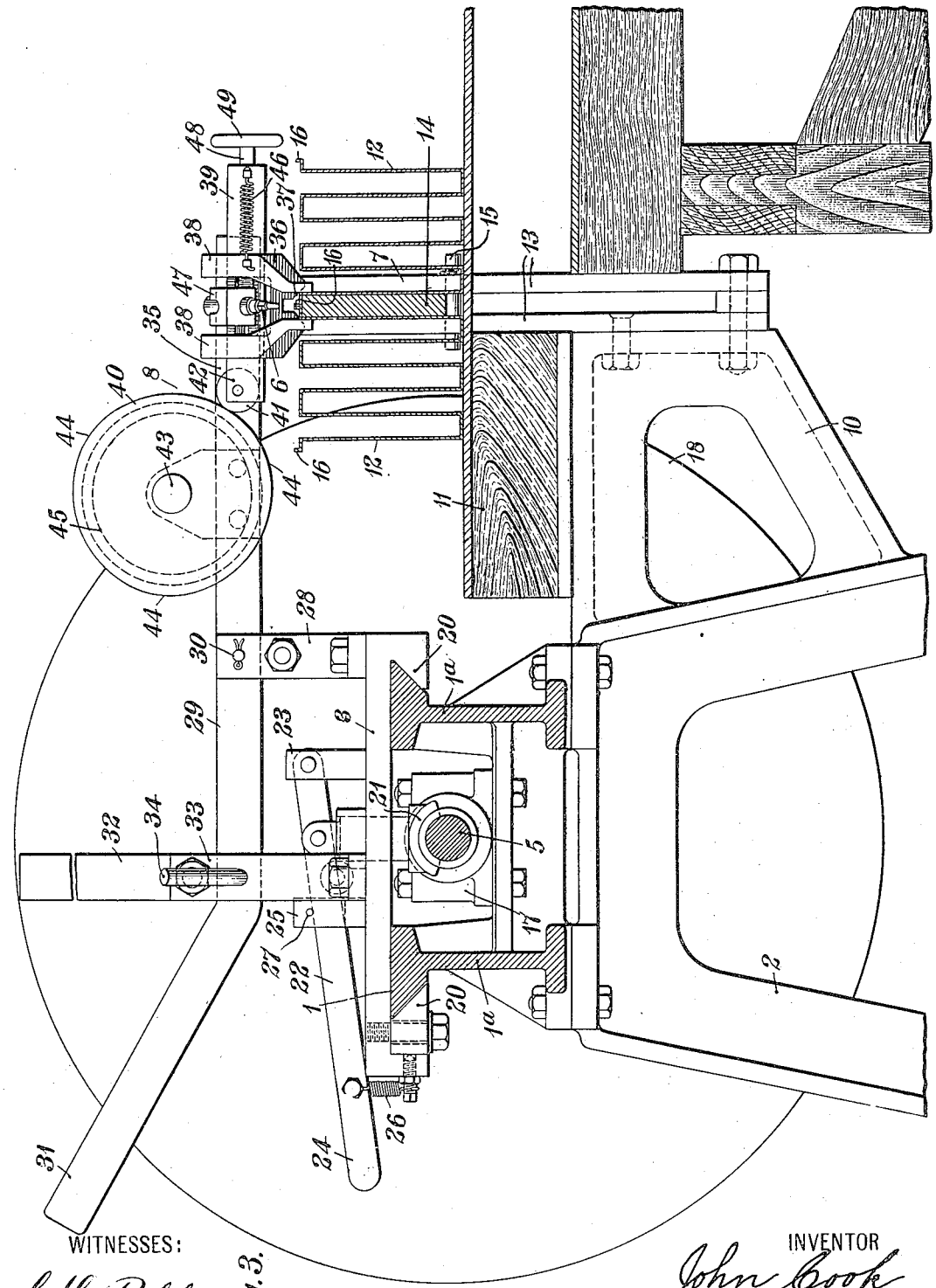

UNITED STATES PATENT OFFICE.

JOHN COOK, OF MANCHESTER, ENGLAND, ASSIGNOR TO WESTINGHOUSE ELECTRIC AND MANUFACTURING COMPANY, A CORPORATION OF PENNSYLVANIA.

WELDING-MACHINE.

1,130,258.  Specification of Letters Patent.  Patented Mar. 2, 1915.

Application filed June 21, 1911. Serial No. 634,586.

*To all whom it may concern:*

Be it known that I, JOHN COOK, a subject of the King of Great Britain, and a resident of Manchester, England, have invented a new and useful Improvement in Welding-Machines, of which the following is a specification.

My invention relates to welding machines and it has particular reference to devices of this class which are specially adapted to weld together the component sections of corrugated sheet metal tanks or plates or the like.

The object of my invention is to provide a device of the above-indicated character which shall be simple and durable in construction, effective and reliable in operation and particularly adapted to perform work of a high and uniform grade in a comparatively short time.

In the commercial manufacture of corrugated transformer tanks, or the like, it has been customary heretofore to weld together the component sections by hand, and the work produced in this manner has been non-uniform and somewhat inferior in quality and has required an excessive expenditure of time.

It is my purpose to overcome the difficulties heretofore encountered and, accordingly, I provide a welding machine embodying a work-supporting means and a suitable heating device, or torch, which is adapted to be moved longitudinally at a uniform rate in coöperative relationship with the seam to be welded, and to which is also imparted a periodic reciprocating transverse movement, whereby any slight irregularities in the seam may be taken care of. By means of this device, a particularly good grade of work and material reductions in time and expense are accomplished.

In the accompanying drawings, Figure 1 is a view, in side elevation, of a device constructed in accordance with my invention; Fig. 2 is an enlarged plan view of a portion of the device shown in Fig. 1; and Fig. 3 is a view, partially in section and partially in end elevation, of the device shown in Fig. 1.

Referring to the drawings, in detail, the apparatus shown comprises a bed or slide 1, supported upon suitable standards or pedestals 2, a plurality of movable carriages 3 and 4 mounted on said bed, a lead screw 5 adapted to cause said carriages to be moved longitudinally on said bed, a heating device or torch 6 which is adapted to supply heat to the work, a work-supporting means 7, a cam mechanism 8 for effecting perdiodic reciprocating transverse movements of said heating device, and a split roller 9 for maintaining the work in position and effecting a certain degree of pressure thereon.

The supporting bed 1 comprises a plurality of longitudinally disposed channel members or slides 1ª which are suitably supported on the pedestals 2 and upon which the carriages 3 and 4 are slidably mounted. The pedestals 2 are provided with bracket members 10 upon which rests a shelf or table 11 which is adapted to support the component corrugated sections 12 of the work to be welded. The end bracket members 10 are further provided with upwardly projecting guides 13 between which is secured a bar 14 which is adapted to be held in position by means of suitable pins 15 for the purpose of supporting and alining the component sections 12 in a manner to be hereinafter set forth. The several sections 12 are rectangularly corrugated in a manner well known in the art, and the extreme edges thereof are turned upwardly to form lips or flanges 16 which abut against one another in the manner shown in Fig. 3 to supply an excess of material whereby additional strength is secured in the welded seam.

Between the channel members or slides 1ª is disposed the square threaded lead screw 5 which is suitably mounted, at its ends, in bearings 17, and one end of which is provided with a pulley 18 by means of which it is uniformly rotated in a well known manner. The carriages 3 and 4 are of like construction and each is provided, at its respective sides, with inwardly projecting inclined members 20 which engage the outer portions of the respective channel members or slides 1ª to maintain the carriages in proper alinement. Furthermore, each carriage is adapted to be operatively associated with the lead screw 5 by means of a threaded member 21 which normally coöperates with said screw throughout a portion of its circumference and is pivotally suspended from a lever 22, one end of the latter being pivotally supported between the upright members 23, and the other end thereof constituting a handle 24 by means of which the threaded member 21 may be disengaged from the lead screw 5. The lever 22 is movable in a vertical plane between guide members 25, and its outer end is provided with a suitable spring 26 for maintaining the threaded member 21 in coöperative engagement with the lead screw 5. The threaded member 21 may be held out of engagement with said lead screw by means of a pin 27 when said pin is inserted in suitable openings in the guide members 25 beneath the said member.

Projecting upwardly from the back portion of the carriage 3 are two bracket members 28 between which a lever 29 is pivotally supported upon a pin 30, the outer end of said lever constituting a handle 31 which is adapted to be moved vertically between suitable guide members 32 and 33, a removable pin 34 being provided for the purpose of securing said lever 29 in position.

The inner end 35 of the lever 29 is provided with a block 36, the under side of which is grooved longitudinally in such manner that the beveled sides 37 thereof are adapted to engage the edges of the work in the manner shown in Fig. 3, whereby the two adjacent sections 12 are held in intimate contact and subjected to a slight pressure. Fingers 38 are rigidly secured to the block 36 and constitute other pressure members which project forwardly and downwardly into coöperative engagement with the edges of the adjacent sections 12, as shown in the drawings. A horizontal member 39 is loosely mounted in the block 36 and is adapted to be periodically reciprocated by means of a three-throw cam 40 which is engaged by a roller 41, said roller being carried on one end 42 of said horizontal member 39. The cam 40 is rotatably mounted upon a shaft 43 which is secured to the lever 29 and comprises three equally spaced portions 44 of slightly different diameters in order to effect a slight back and forth movement of the horizontal member 39 in an old and familiar manner. A suitable pulley 45 is associated with said cam by means of which a uniform rotation may be imparted thereto. In order to maintain the roller 41 in coöperative engagement with the cam 40, a spring 46 is provided, one end of which is secured to the horizontal member 39 and the other end to the adjacent finger 38.

The heating device or torch 6 may be of any well known construction, although I prefer one of the oxy-acetylene type. Inasmuch as the torch forms no part of my invention, except as it performs a necessary function in the operation of the machine, and, inasmuch as the construction and mode of operation of such devices are well known to those skilled in the art, no description of the same will be given.

The torch 6 is secured to a block 47 which is slidably mounted upon the horizontal member 39 in such manner as to be movable in a line parallel to the axis thereof. A rod 48 projects through a portion of the horizontal member 39 and is threaded into the block 47, the other end being provided with a hand-wheel 49 by means of which adjustments of the torch, with respect to the horizontal member 39, may be accomplished in order to bring the torch into alinement with the seam of the work to be welded, as will be readily understood.

The split roller 9 is rotatably mounted on a shaft 50 which is adjustably secured to a bracket member 51 which, in turn, is fastened to the movable carriage 4. The roller 9 is adapted to coöperatively engage the sides of the sections 12 which are to be welded together and to thus maintain the component sections against the bar 14, and to effect intimate contact between the adjacent upturned flanges 16.

Assuming the heating device 6 to be performing its intended function, the cam 40 and lead screw 5 to be rotated at uniform speeds, as hereinbefore set forth, and the various parts of the apparatus to occupy the positions shown, the operation of the device is as follows: It will be noted that the threaded members 21 of the movable carriages 3 and 4 are in operative engagement with the lead screw 5 and, hence, the carriage 3 and its associated heating device 6 and the carriage 4 with its roller 9, are moved longitudinally at a uniform speed. Simultaneously with the longitudinal movement of the heating device 6, said heating device is subjected to a periodic reciprocating transverse movement by means of the cam mechanism 8. Furthermore, the upturned flanges 16 of the component corrugated sections 12 are held in intimate contact with one another and maintained in position upon the bar 14 by means of the split-roller 9 and the projecting fingers 38.

As the machine is operated in the manner set forth, the heating device 6 is brought into coöperative relationship with the upturned flanges 16 of the component sections 12 and said flanges are thus welded or fused together in such manner that a particularly strong and durable seam or joint is produced. Inasmuch as the heating device 6 is reciprocated transversely a slight amount while it is being advanced longitudinally, it is evident that any slight variations in the alinement of the seam are taken care of.

When the heating device 6 has been advanced along the work a sufficient distance to allow the beveled edges 37 of the block 36 to engage the sides of the central corrugation, it is evident that the component sections 12 are maintained in intimate contact with each other immediately in advance of and behind the portion to which the heat is applied, so that the best results are obtained. The process continues at a uniform rate in the manner described until the heating device 6 has traversed the entire length of the sections 12 and said sections have been securely welded together. When the heating device 6 approaches the limit of its travel, the split roller 9 no longer engages the work and the flanges 16 are held in contact with one another by means of the fingers 38 and the beveled sides 37 of the block 36.

Having welded the adjacent sections 12 throughout their entire length, the operation of the machine may be stopped; after which the pins 15 are withdrawn from the upright members 13 and the bar 14 lowered out of engagement with the work. The welded portion of the work may then be moved backward upon the shelf or table 11 and a new section brought into position, after which the bar 14 is again raised under the work and secured in the manner hereinbefore set forth. When the machine is brought to rest, care should be taken to raise the heating device 6 by forcing the handle 31 downwardly in order that the continued application of heat to the bar 14 shall not cause damaging results thereto. If it be desired to arrest the longitudinal movement of the heating device 6 during the operation, it is merely necessary to raise the threaded portion 21 of the carriage 3 out of engagement with the lead screw 5 by means of the lever member 22, as will be readily understood.

Having brought the heating device or torch 6 to rest, it is further necessary to withdraw it from the work by means of the lever 29, as already explained, in order that holes shall not be burned in the work or other injury caused by reason of the continued application of heat. Furthermore, it is also desirable to raise the threaded portion 21 of the movable carriage 4 out of engagement with the lead screw 5 in order that the distance of the split roller 9 in advance of the heating device 6 may be maintained constant. The continuation of the process may, of course, be resumed at any time merely by causing the cooperative engagement of the threaded members 21 with the lead screw 5 and by lowering the heating device 6 into its normal position. In case the seam between the upturned flanges 16 of the component sections 12 is found to be substantially straight and free from irregularities, the periodic reciprocating motion of the heating device 6 may be dispensed with, although it will generally be found desirable.

Although I have shown and described a device having specific structural details and arrangement and location of parts, it is evident that various modifications may be effected therein without exceeding the spirit and scope of my invention, and I desire that only such limitations shall be imposed as are indicated in the appended claims.

I claim as my invention:

1. In a welding machine, the combination with a work-holding means, a source of heat, and means for moving said source of heat longitudinally in coöperative relationship with said work, of means movable in synchronism with said source of heat for effecting pressure on said work both in advance of and behind said source.

2. In a welding machine, the combination with a work-holding means, a device for applying heat to said work, and means for moving said heating device along said work, of means for effecting a transverse movement of said heating device.

3. In a welding machine, the combination with a work-holding means, a device for applying heat to said work, and means for longitudinally moving said heating device along said work, of means for effecting a reciprocating transverse movement thereof.

4. In a welding machine, the combination with a work-holding means, a device for applying heat to said work, and means for effecting a uniform longitudinal movement of said heating device in coöperative relationship with said work, of means for simultaneously effecting a periodic reciprocating transverse movement thereof.

5. In a welding machine, the combination with a work-holding means, and a supporting bed, of a heating device mounted on said bed and adapted to be moved uniformly in coöperative relationship with said work, and movable pressure members mounted on said bed and adapted to effect pressure on said work both immediately in advance of and behind said heating device.

6. In a welding machine, the combination with a work-supporting means, a longitudinal bed or slide, and a lead screw, of a carrier slidably mounted on said bed, means for operatively associating said carrier with said lead screw, a heating device supported on said carrier and adapted to coöperate with said work, means associated with said carrier and located ahead of the heating device for effecting pressure on said work in advance of the welding operation, and means for exerting pressure upon the work behind the heating device.

7. In a welding machine, the combination with a heating device adapted to be moved uniformly and longitudinally in coöperative relationship with the work, of a cam-actuated mechanism for periodically reciprocating said heating device in a transverse direction.

8. In a welding machine, the combination with a work-supporting means, a supporting bed or slide, and a carrier mounted on said bed and adapted to be moved longitudinally, of a heating device associated with said carrier and adapted to coöperate with said work, and means also associated with said carrier for maintaining intimate contact of the work immediately in advance of and behind said heating device.

9. In a machine for welding the edges of side-by-side metal sheets, the combination with a supporting means interposed between said sheets and means for effecting intimate contact between the edges to be welded, of a heating device supported in coöperative relationship with said edges, and means for moving said heating device along the same.

10. In a machine for welding the edges of side-by-side metal sheets, the combination with a heating device, and means for moving the said device longitudinally in coöperative relationship with said edges, of longitudinally disposed supporting means located between said sheets, and means for applying external pressure to said edges.

11. In a machine for welding the edges of corrugated metal sheets, the combination with a heating device and means for moving said device longitudinally in coöperative relationship with said edges, of a longitudinally disposed interposed supporting bar for the adjacent edges of said corrugated sheets, and a movable roller for coöperating with said bar and for pressing said sheets against said bar in advance of said heating device.

In testimony whereof, I have hereunto subscribed my name this second day of June 1911.

JOHN COOK.

Witnesses:
  J. S. PECK,
  G. W. PINNER.